Sept. 24, 1935.    M. T. LOTHROP ET AL    2,015,229
TAPERED ROLLER BEARING UNIT
Filed Oct. 16, 1934    2 Sheets-Sheet 1

INVENTOR
Marcus T. Lothrop
Miller S. Tyson
BY
Evans & McCoy
ATTORNEYS

Patented Sept. 24, 1935

2,015,229

UNITED STATES PATENT OFFICE 2,015,229

TAPERED ROLLER BEARING UNIT

Marcus T. Lothrop and Miller S. Tyson, Canton, Ohio; said Tyson assignor to said Lothrop; Margaret F. Lothrop executrix of said Marcus T. Lothrop, deceased Application October 16, 1934, Serial No. 748,492

12 Claims. (Cl. 308—218)

This invention relates to tapered roller bearings and more particularly to retainers or cages for the rollers thereof.

One of the objects of the present invention is to provide a tapered roller bearing construction having a new and improved retainer or cage for the rollers thereof which is simple in construction and which can be economically manufactured and yet will provide for more efficient operation of the rollers.

Another object is to provide a tapered roller bearing with a roller cage which is so arranged that the tendency towards the creation of undue friction between the rollers and cage upon wearing of the bearing parts is minimized.

A further object is to provide a tapered roller bearing unit with a roller cage which is of such construction and so arranged to be supported that it will not tend to create undue friction with the rollers in the event the bearing parts become worn.

With the above and other objects in view, the present invention consists in certain features of construction and combinations of parts to be hereinafter described with reference to the accompanying drawings, and then claimed.

In the drawings, which illustrate suitable embodiments of the invention,

Figure 2:
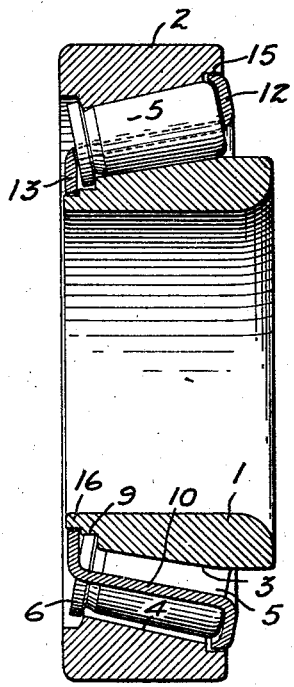
Fig. 2 is a transverse section of the bearing unit taken approximately on line 2—2 of Fig. 1.
Figure 1:
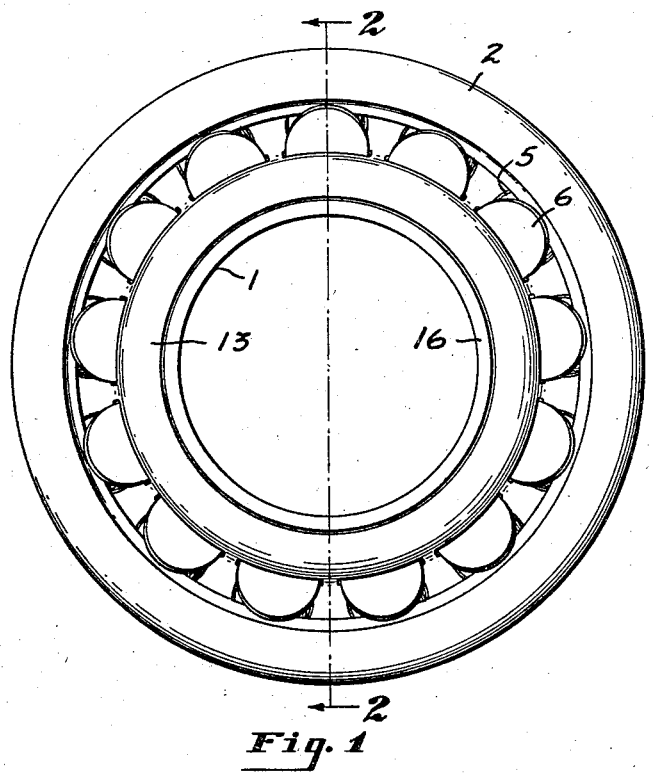
Figure 1 is a side elevation of the assembled bearing unit.
Figure 3:
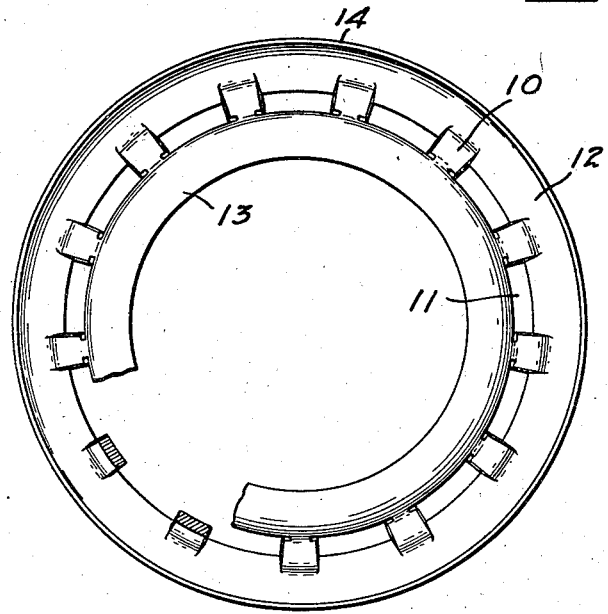
Fig. 3 is a side elevation of the roller cage as viewed from its end of smaller diameter.
Figure 4:
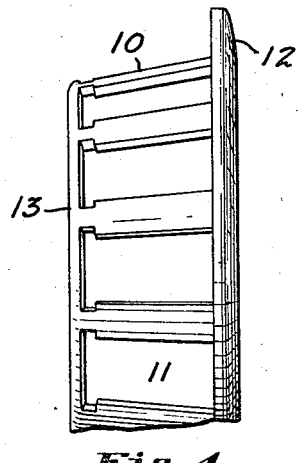
Fig. 4 is a fragmentary view of the cage, looking towards the roller slots.

In conventional tapered roller bearings no provision, other than the rollers, is made for supporting or guiding the cage and it has been found that after the parts of the bearing unit have become worn, there is a tendency for the cage to drop from its coaxial position with respect to the axis of the unit and act as a brake on the rollers by reason of the increased friction. This undue friction not only retards the freedom of rolling action but also has a tendency to cause misalignment of the rollers, which, of course, is disastrous to the bearing structure.

In the bearing construction of the present invention, we guard against the possibility of the occurrence of this undue and undesirable friction between the cage and rollers and insure that even though the bearing unit becomes worn, the cage will not interfere with free and efficient rolling of the rollers.

Referring to the accompanying drawings, in which like numerals refer to like parts throughout the several views, the roller bearing unit which we have selected for illustration of the present invention comprises concentric cone and cup elements 1 and 2, respectively, which are provided with suitable conical roller engaging surfaces 3 and 4 respectively, between which the tapered rollers 5 are disposed for rolling contact.

Each tapered roller 5 is provided with a head 6 at its smaller end, the head 6 having a spherical surface 7 facing and contacting a radial face 8 formed at the smaller end of the cone element 1, at a single point so as to take the roller end thrust which may be imposed, and yet not interfere with the alignment of the rollers and with free rolling action of the same.

Figure 5:
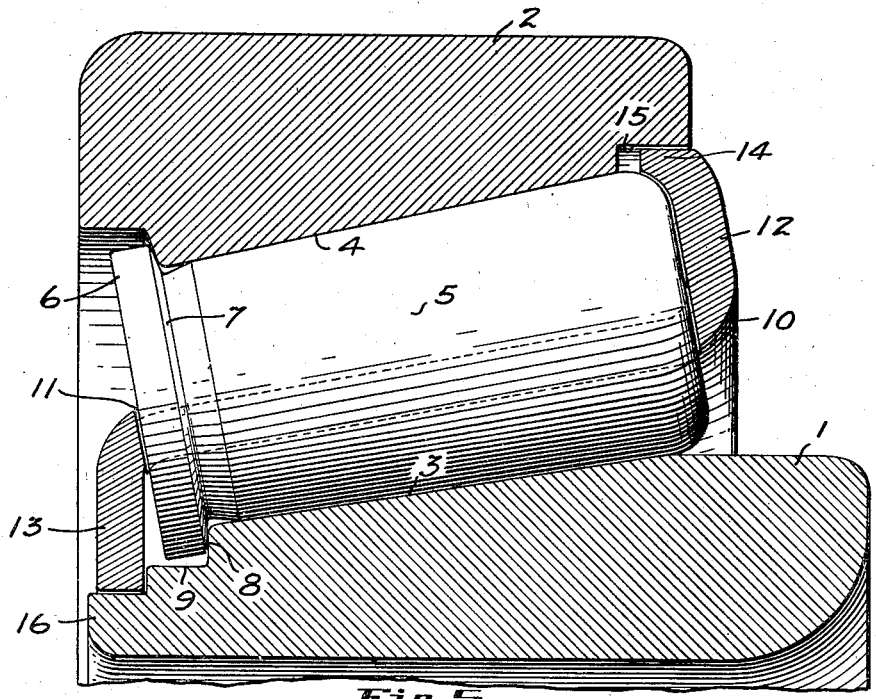
Fig. 5 is a section enlarged approximately ten times of the bearing structure.

In the construction shown in Figures 2 and 5 the radial face 8 is provided by a shoulder formed by an end portion 9 of the cone element, which is sufficiently reduced in diameter to not interfere with the roller heads 6. In the construction shown in Figure 6, the reduced end portion is eliminated and the radial face 8 is the end face of the cone element.

While we have shown the tapered rollers 5 as having heads 6, it is to be understood that the present invention, which will now be described, is also applicable to other types of tapered rollers.

As in conventional practice, a retainer or cage 10 is used in connection with the tapered rollers 5, but the cage differs in many material respects from the conventional cage.

The cage 10 is formed to frusto conical shape from a single sheet of metal and has a series of regularly spaced, tapering slots 11 for receiving the rollers 5. As here shown, a cup assembly is provided, the external line of taper of the cage being at or within the pitch line of the rollers and the tapering width of the slots 11 at the internal surface of the cage 10 being less than the diametral width of the rollers, so that in case the cone element 1 is removed, the cage 10 will retain the rollers within the cup element 2. However, it is to be understood that the bearing unit may be of the cone assembly type, wherein the line of taper of the inner surface of the cage 10 will lie without the pitch line of the rollers.

In order to accomplish either such assembly it is obvious that the slots and rollers must have a very small working clearance. It is because of this necessary small clearance in conventional cages that, upon wear of the bearing parts, the rollers and cage may become so disposed that the rollers tightly engage the sides of the slots which will produce such a braking action on the rollers that free rolling action is prevented. In order to prevent this from occurring we maintain the cage substantially coaxial at all times with the axis of the bearing unit and we do this by providing the larger end of the cage 10 with a radially outwardly extending flange 12 and the smaller end of the cage with a radially inwardly extending flange 13.

The flange 12, if desired, is flanged slightly as indicated at 14, although this is not essential. The peripheral edge of this flange 14 or the flange 12, where flange 14 is omitted, lies within the circumferential wall 15 provided by a coaxial counterbore within the end of the cup element 2 having the larger internal diameter with a circumferential clearance, but the clearance between this peripheral edge and the circumferential wall 15 is relatively small.

In the construction shown in Figures 2 and 5 the cone element is provided with a further reduced end portion 16 which projects through the opening in flange 13 with a clearance which is substantially the same as the degree of the clearance between flange 12 and the wall 15.

This provides a construction in which the cage 10 is practically guided or supported at its opposite ends, the one end by the cone element and the other end by the cup element. The clearances referred to are such that the flanges will not fit tightly but will rotate freely and yet will prevent any substantial drop of the cage in the event the parts become worn, and thereby prevent undue frictional engagement between the rollers and sides of the slots which, as previously described, acts as a brake on the rollers in conventional constructions and hinders free rolling action.

Figure 6:
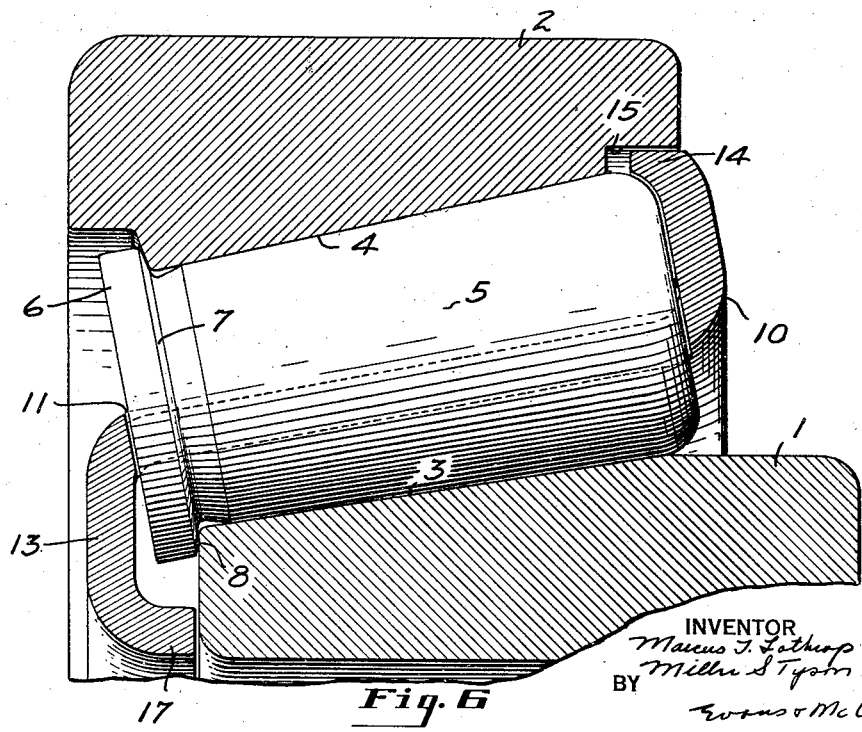
Fig. 6 is a view similar to Fig. 5 of a slightly modified cage construction.

In the construction shown in Figure 6, the reduced end portion of the cone element has been eliminated and in this construction the flange 13 is axially flanged at its inner periphery, as indicated at 17, and this flange 17 is of only slightly less internal diameter than the internal diameter of the cone element 1, so that the flange 17 will have a clearance with the shaft or trunnion on which the cone element is mounted, corresponding to the clearance between flange 12 and the circumferential wall 15.

The cage 10, however, functions in the same manner in both constructions and is effective to prevent the occurrence of undue friction between the rollers and the sides of the roller receiving slots of the cage.

It will be noted in the constructions shown and described that the flanges of the cage will not interfere with the removal of the cone element and will not interfere with the removal of the cage from the cup element.

Although only two embodiments of the invention have been herein shown and described, it will be understood that numerous details of the construction shown may be altered or omitted without departing from the spirit of this invention, as defined in the following claims.

What we claim is:
1. A tapered roller bearing comprising concentric cone and cup elements having conical roller engaging surfaces, said rollers having head portions cooperatively engaged with the end face of least diameter thereof and relatively close to the line of the roller engaging surface thereof to prevent axial movement of said rollers in a direction away from the apex of the bearing, a plurality of spaced tapered rollers between said surfaces, a tapered free floating non-loaded roller cage having a wall of relatively thin thickness as compared with the average diameter of said rollers, having spaced roller receiving slots therein, and means for supporting said cage upon wear of the bearing parts to prevent binding between said rollers and the sides of said slots.

2. A tapered roller bearing comprising concentric cone and cup elements having conical roller engaging surfaces, said rollers having head portions cooperatively engaged with the end face of least diameter thereof and relatively close to the line of the roller engaging surface thereof to prevent axial movement of said rollers in a direction away from the apex of the bearing, a plurality of spaced tapered rollers between said surfaces, a tapered free floating non-loaded roller cage having a wall of relatively thin thickness as compared with the average diameter of said rollers, having spaced roller receiving slots therein, and means for supporting the ends of said cage upon wear of the bearing parts to prevent binding action and the occurrence of undue friction between said rollers and the sides of said slots.

3. A tapered roller bearing comprising concentric cone and cup elements having conical roller engaging surfaces, a plurality of spaced tapered rollers between said surfaces, a tapered roller cage having spaced roller receiving slots therein, said cup element having an internally presenting circumferential wall at its end of larger internal diameter, said cone element having an end portion at its end of smaller diameter, said end portion being of lesser diameter than the smallest diameter of the conical surface of said cone element, and means for supporting said cage upon wear of the bearing parts to prevent binding action and the occurrence of undue friction between said rollers and the sides of said roller receiving slots, said means comprising a flange extending in a radially outward direction from the larger end of said cage and having its circumferential edge disposed within said circumferential wall with a relatively small circumferential clearance, and a flange extending in a radially inward direction from the smaller end of said cage and surrounding said reduced end portion with a relatively small circumferential clearance, the minimum circumferential width of each slot at each point throughout its length being less than the diameter at a corresponding point of the roller contained therein, and lying within the centerline circle of said rollers, whereby upon removal of said cone element the rollers will be confined within said cup element.

4. A tapered roller bearing comprising concentric cone and cup elements having conical roller engaging surfaces, a plurality of spaced tapered rollers between said surfaces, a tapered roller cage having spaced roller receiving slots therein, said cup element having an internally presenting circumferential wall at its end of larger internal diameter, and means for supporting said cage upon wear of the bearing parts to prevent binding and the occurrence of undue friction between said rollers and the sides of said roller receiving slots, said means comprising a flange extending radially outwardly from the larger end of said cage and having its circumferential edge lying adjacent said circumferential wall with a relatively small circumferential clearance, the minimum circumferential width of each slot at each point throughout its length being less than the diameter at a corresponding point of the roller contained therein, and lying within the centerline circle of said rollers, whereby upon removal of said cone element, the rollers will be confined within said cup element.

5. A tapered roller bearing comprising concentric cone and cup elements having conical roller engaging surfaces, said rollers having head portions cooperatively engaged with the end face of least diameter thereof and relatively close to the line of the roller engaging surface thereof to prevent axial movement of said rollers in a direction away from the apex of the bearing, a plurality of spaced tapered rollers between said surfaces, a tapered free floating non-loaded roller cage having spaced roller receiving slots therein, the wall of said cage being relatively thin as compared with the average diameter of said rollers, said cup element having an internally presenting circumferential wall at its end of larger internal diameter, and means for supporting said cage upon wear of the bearing parts to prevent binding and the occurrence of undue friction between said rollers and the sides of said roller receiving slots, said means comprising a flange extending radially outwardly from the larger end of said cage and having its circumferential edge lying adjacent said circumferential wall with a relatively small circumferential clearance and a flange extending radially inwardly from the smaller end of said cage, said cone element having an axial shaft receiving opening, the internal diameter of said last mentioned flange being only slightly less than the diameter of said shaft-receiving opening.

6. A tapered roller bearing comprising concentric cone and cup elements having conical roller engaging surfaces, said rollers having head portions cooperatively engaged with the end face of least diameter thereof and relatively close to the line of the roller engaging surface thereof to prevent axial movement of said rollers in a direction away from the apex of the bearing, a plurality of spaced tapered rollers between said surfaces, a tapered free floating non-loaded roller cage having spaced roller receiving slots therein, the wall of said cage being relatively thin as compared with the average diameter of said rollers, said cup element having an internally presenting circumferential wall at its end of larger internal diameter, and means for supporting said cage upon wear of the bearing parts to prevent binding and the occurrence of undue friction between said rollers and the sides of said roller receiving slots, said means comprising a flange extending radially outwardly from the larger end of said cage and having its circumferential edge lying adjacent said circumferential wall with a relatively small circumferential clearance, and a flange extending radially inwardly from the smaller end of said cage and having an axial flange at its radially inner edge, said cone element having an axial shaft receiving opening, the internal diameter of said last mentioned flange being only slightly less than the diameter of said shaft receiving opening.

7. A tapered roller bearing comprising concentric cone and cup elements having conical roller engaging surfaces, said rollers having head portions cooperatively engaged with the end face of least diameter thereof and relatively close to the line of the roller engaging surface thereof to prevent axial movement of said rollers in a direction away from the apex of the bearing, a plurality of spaced tapered rollers between said surfaces, a tapered free floating non-loaded roller cage having spaced roller receiving slots therein, the wall of said cage being relatively thin as compared with the average diameter of said rollers, said cup element having an internally presenting circumferential wall at its end of larger internal diameter, and means for supporting said cage upon wear of the bearing parts to prevent binding and the occurrence of undue friction between said rollers and the sides of said roller receiving slots, said means comprising a flange extending radially outwardly from the larger end of said cage and having a circumferential flange at its circumferential edge lying adjacent said circumferential wall with a relatively small circumferential clearance.

8. A tapered roller bearing comprising concentric cone and cup elements having conical roller engaging surfaces, a plurality of spaced tapered rollers between said surfaces, a tapered roller cage having spaced roller receiving slots therein, said cup element having an internally presenting circumferential wall at its end of larger internal diameter, said cone element having an end portion at its end of smaller diameter, said end portion being of lesser diameter than the smallest diameter of the conical surface of said cone element, and means for supporting said cage upon wear of the bearing parts to prevent binding action and the occurrence of undue friction between said rollers and the sides of said roller receiving salts, said means comprising a flange extending in a radially outward direction from the larger end of said cage and having a circumferential flange at its circumferential edge disposed within said circumferential wall with a relatively small circumferential clearance, and a flange extending in a radially inward direction from the smaller end of said cage and surrounding said reduced end portion with a relatively small circumferential clearance, the minimum circumferential width of each slot at each point throughout its length being less than the diameter at a corresponding point of the roller contained therein, and lying within the centerline circle of said rollers, whereby upon removal of said cone element, the rollers will be confined within said cup element.

9. A tapered roller bearing comprising concentric cone and cup elements having conical roller engaging surfaces, said rollers having head portions cooperatively engaged with the end face of least diameter thereof and relatively close to the line of the roller engaging surface thereof to prevent axial movement of said rollers in a direction away from the apex of the bearing, a plurality of spaced tapered rollers between said surfaces, a tapered free floating non-loaded roller cage having spaced roller receiving slots therein, the wall of said cage being relatively thin as compared with the average diameter of said rollers, said cup element having an internally presenting circumferential wall at its end of larger internal diameter, and means for supporting said cage upon wear of the bearing parts to prevent binding and the occurrence of undue friction between said rollers and the sides of said roller receiving slots, said means comprising a flange extending radially outwardly from the larger end of said cage and having a circumferential flange at its circumferential edge lying adjacent said circumferential wall with a relatively small circumferential clearance, and a flange extending radially inwardly from the smaller end of said cage, said cone element having an axial shaft receiving opening, the internal diameter of said last mentioned flange being only slightly less than the diameter of said shaft-receiving opening.

10. A tapered roller bearing comprising concentric cone and cup elements having conical roller engaging surfaces, said rollers having head portions cooperatively engaged with the end face of least diameter thereof and relatively close to the line of the roller engaging surface thereof to prevent axial movement of said rollers in a direction away from the apex of the bearing, a plurality of spaced tapered rollers between said surfaces, a tapered free floating non-loaded roller cage having spaced roller receiving slots therein, the wall of said cage being relatively thin as compared with the average diameter of said rollers, said cup element having an internally presenting circumferential wall at its end of larger internal diameter, and means for supporting said cage upon wear of the bearing parts to prevent binding and the occurrence of undue friction between said rollers and the sides of said roller receiving slots, said means comprising a flange extending radially outwardly from the larger end of said cage and having a circumferential flange at its circumferential edge lying adjacent said circumferential wall with a relatively small circumferential clearance, and a flange extending radially inwardly from the smaller end of said cage and having an axial flange at its radially inner edge, said cone element having an axial shaft receiving opening, the internal diameter of said last mentioned flange being only slightly less than the diameter of said shaft receiving opening.

11. A tapered roller bearing comprising concentric cone and cup elements having conical roller engaging surfaces, a plurality of spaced tapered rollers between said surfaces, said cup element having an inwardly presenting circumferential wall, said cone element having an axial opening, and a tapered roller retaining cage having roller receiving slots therein, said cage having a flange extending in a radially outward direction from its larger end and lying within said circumferential wall, and a flange extending in a radially inward direction from its smaller end, said last mentioned flange having a central opening substantially coaxial with and having a circumferential clearance with respect to said first mentioned opening on the part received therein, said clearances being small and such that upon wear of the bearing parts, said flanges support said cage and prevent binding and the occurrence of friction between said rollers and the sides of said roller receiving slots, the minimum circumferential width of each slot at each point throughout its length being less than the diameter at a corresponding point of the roller contained therein, and lying within the centerline circle of said rollers, whereby upon removal of said cone element, the rollers will be confined within said cup element.

12. A tapered roller bearing comprising concentric cone and cup elements having conical roller engaging surfaces, a plurality of spaced tapered rollers between said surfaces, said cup element having an inwardly presenting circumferential wall, said cone element having an axial opening and an end portion at its smaller end smaller in diameter than the small end of the conical surface of said cone element, and a tapered roller retaining cage having roller receiving slots therein, said cage having a flange extending in a radially outward direction from its larger end and lying within said circumferential wall with a circumferential clearance, and a second flange extending in a radially inward direction from its smaller end and surrounding said end portion with a circumferential clearance, said clearance being relatively small and such that, upon wear of the bearing parts, said cage is supported by the cone and cup element to prevent binding and the occurrence of friction between said rollers and the sides of said roller receiving slots, the minimum circumferential width of each slot at each point throughout its length being less than the diameter at a corresponding point of the roller contained therein, and lying within the centerline circle of said rollers, whereby upon removal of said cone element, the rollers will be confined within said cup element.

MARCUS T. LOTHROP.
MILLER S. TYSON.